United States Patent [19]
Marchese

[11] Patent Number: 5,816,905
[45] Date of Patent: Oct. 6, 1998

[54] COLOR CODED BINDERS FOR PACKAGING

[75] Inventor: Gerald J. Marchese, West Chicago, Ill.

[73] Assignee: Tie-Net International, Inc, West Chicago, Ill.

[21] Appl. No.: 939,313

[22] Filed: Sep. 29, 1997

[51] Int. Cl.⁶ ..................................................... A22C 21/00
[52] U.S. Cl. ............................................. 452/174; 452/176
[58] Field of Search ..................................... 452/174, 176

[56] References Cited

U.S. PATENT DOCUMENTS 2,842,443  7/1958  Rice et al. ............................... 452/176
3,787,993  1/1974  Lyon ......................................... 40/306

OTHER PUBLICATIONS

Advertising Brochure and Price List, "Chicken Tuckers"; TNI Packagin, Inc. copyright, 1994.

Primary Examiner—Willis Little
Attorney, Agent, or Firm—Banner & Witcoff, Ltd.

[57] ABSTRACT

A kit for identifying a cooking process applied to poultry includes color coded elastic loops having a polyester and cotton fabric sleeve which is color coded and correlated with the process applied to the poultry.

1 Claim, 2 Drawing Sheets

COLOR CODED BINDERS FOR PACKAGING

BACKGROUND OF THE INVENTION

This invention relates to a kit of elastic poultry fasteners which are useful in the processing of poultry, particularly cooked poultry to enable easy identification of the cooking process utilized with respect to the poultry.

Heretofore, the utilization of elongated elastic loops for trussing a chicken for processing has been known. The elastic loop is typically in the range of 13 inches in length, although depending upon the type of poultry involved, the elastic loop may have any desired length. The elastic band then fits about the legs and body of the chicken in a number of various ways so as to hold the chicken or poultry in a very compact fashion. The elastic fastener or loop has typically in the past been a unitary color and merely applied to the poultry or chicken for processing. The loops have additional uses such as holding pre-sliced hams, stuffed pork chops and other food products. Typically the loops are made of a cotton polyester blend of woven material which fits over an elastic material. The loop sizes may vary from 6 to 16 inches.

There has remained, however, the need to develop a loop which is indicative of the processing applied to the poultry or other product.

SUMMARY OF THE INVENTION

Briefly the present invention comprises a kit for identifying the cooking process applied to fowl or poultry or other processed products wherein the process may consist of roasting, barbecuing or cooking in combination with a specific flavoring. The kit includes a plurality of various elastic loops. Groups of the loops have a distinctive color each correlated with one of the cooking processes. The loops are thus elongateable to truss the poultry or fowl in a compact shape for cooking by holding the legs and body of the fowl together. The loops are placed on the fowl prior to cooking and then correlate the particular cooking process with the color of the loop. Preferably, the loops are of a single color. However, multi-colored loops may also be utilized again correlated with the particular process associated with the poultry.

Thus it is an object of the invention to provide an improved elastic poultry fastener kit.

It is a further object of the invention to provide an improved elastic poultry fastener kit comprised of a collection of elongated closed elastic loops which may be utilized to hold poultry or other products.

Yet another object of the invention is to provide a kit of elastic loops for poultry and food processing which are correlated with the processing.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

The elastic loops of the present invention are fabricated from an elastomeric material such as rubber which is formed or tied in the shape of a loop and which is coated by a cotton and polyester woven material to preclude the loop from sticking during a cooking process to poultry, fowl or other foods. The loops have a circumference generally in the range of 6 to 16 inches. They are formed by cutting lengths of loop material to slightly greater than the desired circumference. The ends of the cut material then join in a tieing operation. A closed loop is thereby formed.

An important part of the invention constitutes the cotton and polyester fabric coating or sleeve for the loop. The cotton and polyester fabric is chosen for its color. Any one of a variety of colors, such as red, tan, burgundy, green, yellow or brown, may be utilized. In addition to solid coloring of the loops, the loop may have various shapes and patterns, such as a candy striped pattern, or a series of segmented colors. In any event, the color or pattern of the loop is associated with and included as part of a kit of such loops correlated with a particular cooking process. For example, a burgundy colored loop may indicate a spicy hot cooking roasting method. A dark brown loop might indicate an oven roasting process. There are many correlations that can be effected between the color or pattern of the loop and the cooking process. However, users of the loops will develop his or her own correlation. A kit of such loops thus may be utilized in combination with a cooking process in accord with the desires of the user.

Figure 1:
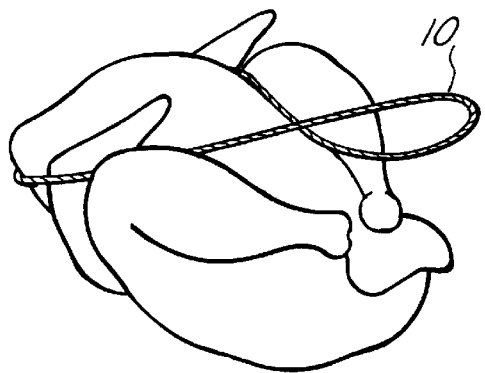
FIG. 1 is a perspective view of a chicken illustrating a first method of utilization of utilization of the elastic loop.
Figure 2:
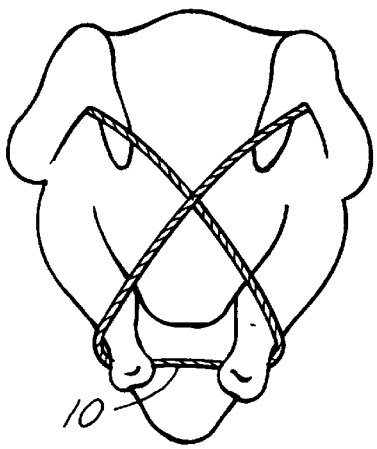
FIG. 2 is correlated with FIG. 1 and is a perspective view of the continued elastic trussing process of FIG. 1.
Figure 3:
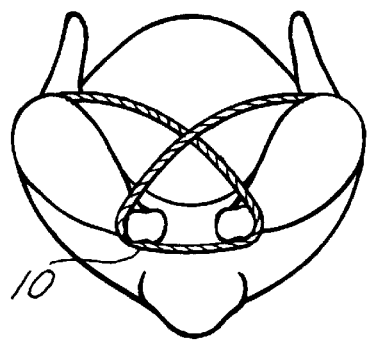
FIG. 3 is an end view of the chicken which has been trussed in accord with the process exemplified by FIG. 1.
Figure 4:
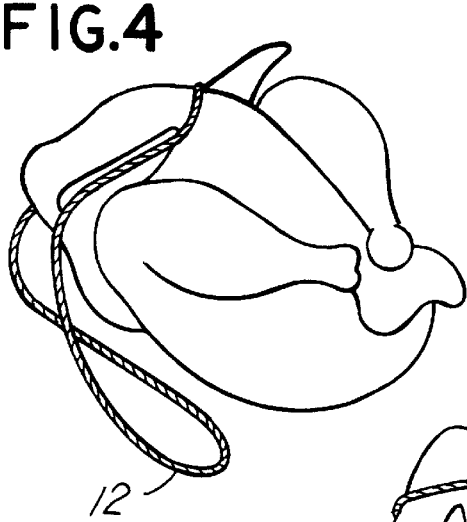
FIG. 4 is a perspective view of a second method of utilizing the elastic loops from the kits of the invention.
Figure 5:
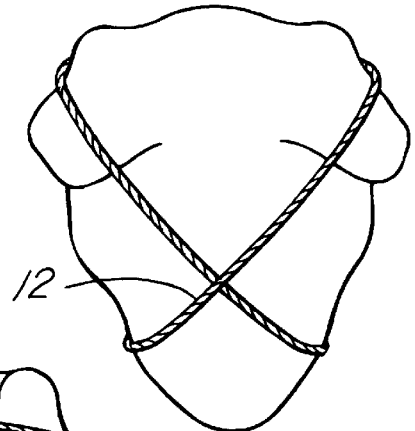
FIG. 5 is a further exemplification of the process of FIG. 4.
Figure 6:
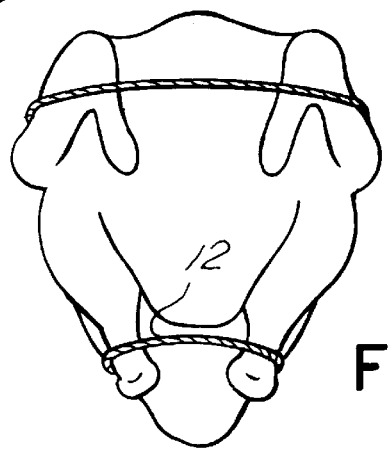
FIG. 6 is a plan view of the fowl processed in accord with the method of FIG. 4.
Figure 7:
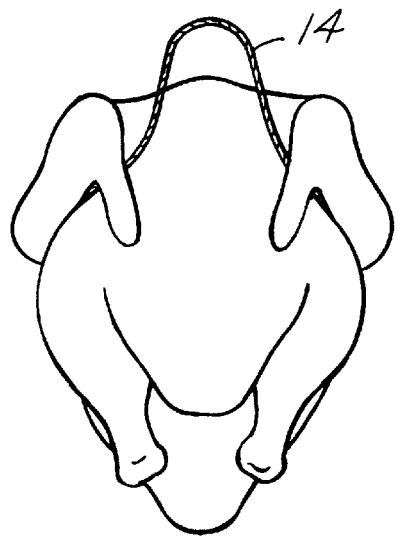
FIG. 7 is a plan view of a third process utilizing the elastic loops of the invention.
Figure 8:
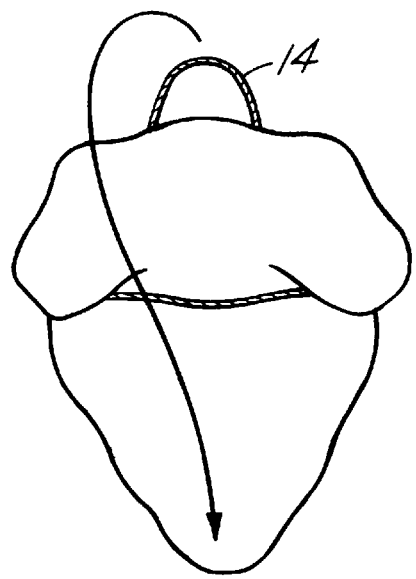
FIG. 8 is a further plan view of the further step of the process of FIG. 7.
Figure 9:
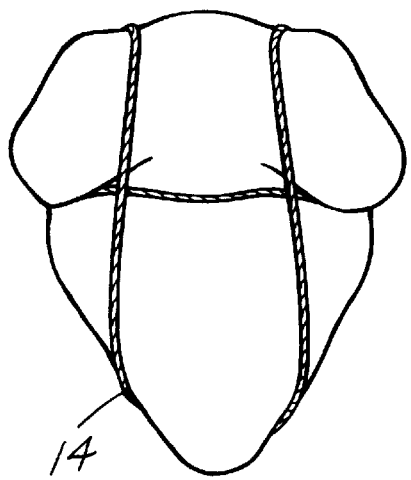
FIG. 9 is a top plan view of the process exemplified by FIGS. 7 and 8.
Figure 10:
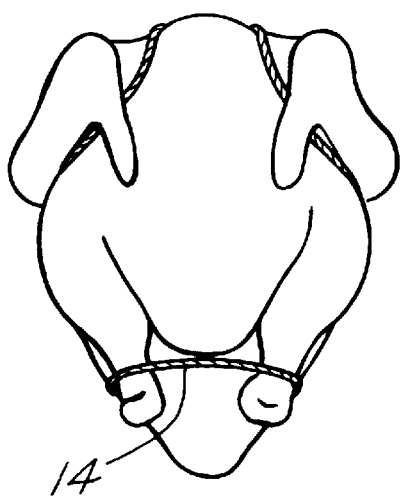
FIG. 10 is a bottom plan view of the elastic loop utilized in FIG. 9.

The loops may be utilized in any of innumerable ways to wrap poultry for example and hold it in a tightly configured condition which accentuates the cooking operation. FIGS. 1 through 3 illustrate a first method, known as the across the breast method. FIGS. 4 through 6 illustrate the across the back method, and FIGS. 7–10 illustrate the parallel method.

Referring to FIGS. 1–3, in particular FIG. 1, starting at the neck region of the poultry the loop 10 is placed over the tip of the wings of the poultry. Then the loop 10 is twisted and crossed over the breast of the poultry as illustrated in FIG. 2 and finally placed over the legs as illustrated in FIGS. 2 and 3.

Referring to FIGS. 4–6 and in particular FIG. 4, again starting at the neck area, the loop 12 is placed over the neck and the tip of the wing of the poultry. The loop 12 is then twisted over the back as illustrated in FIG. 5 and then placed over the legs as illustrated in FIG. 3.

The parallel method illustrated in FIGS. 7–10 begins with the breast side positioned in the palm of the hand of the user. The loop 14 is then positioned toward the neck of the poultry over the wing but under the wing tips. The top of the loop 14 is then pulled over the neck and across the back and over the legs of the fowl. Opposite strands or runs of the loop 14 are then parallel across the backside of the poultry as illustrated.

The loops 10, 12 or 14 are positioned on the poultry in any one of the ways described or in any other fashion and then the poultry may be processed or cooked as desired. Alternatively, the poultry may be packaged frozen and then made available for subsequent cooking. The coloration of the loops is in each instance coordinated with a particular processing and spices or other materials that are used in combination with the poultry during processing. The color of the loop thus provides an indicia for a cook or homemaker to indicate the manner in which the poultry has been preprocessed.

While there has been set forth various alternative embodiments of the invention, it is to be understood that the invention is to be limited only by the following claims and their equivalents.

What is claimed is:

1. A method for identifying the cooking process applied to fowl comprising, in combination:

selecting one of a plurality of elastic loops in the range of 6 to 16 inches in circumference, selected loops each having an elastic core and a woven coating of a fabric material, said coating having a distinctive color or colors correlated with one of a plurality of cooking processes, said loops elastically elongateable to truss the fowl in a compact shape for cooking by holding the legs and body of the fowl, each of said distinctive colored loops correlated separately with a separate process for cooking taken from a group consisting of roasting, barbecuing, cooking with a spice and cooking with a flavoring;

applying one of said distinctive loops to one of said fowl to truss the fowl in a compact shape;

processing said one fowl in accord with the cooking process indicated by the distinctive elastic loop; and displaying the processed fowl with the distinctive loop exposed to thereby disclose the cooking process applicable to the fowl for purposes of identification of the processed fowl.

* * * * *